United States Patent
Heil et al.

(10) Patent No.: US 10,112,813 B2
(45) Date of Patent: *Oct. 30, 2018

(54) SAFETY BRAKE FOR A LIFTING DEVICE

(71) Applicant: Siemens Aktiengesellschaft, Munich (DE)

(72) Inventors: Reudiger Heil, Goldbach (DE); Eugen Staub, Sommerkahl (DE); Walfried Hoermann, Schoellkrippen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/542,965

(22) PCT Filed: Jan. 15, 2016

(86) PCT No.: PCT/EP2016/050717
§ 371 (c)(1),
(2) Date: Jul. 12, 2017

(87) PCT Pub. No.: WO2016/113373
PCT Pub. Date: Jul. 21, 2016

(65) Prior Publication Data
US 2018/0002148 A1    Jan. 4, 2018

(30) Foreign Application Priority Data

Jan. 15, 2015 (EP) .................................... 15151312
Jan. 13, 2016 (EP) .................................... 16151027

(51) Int. Cl.
*B66D 5/00* (2006.01)
*B66D 5/34* (2006.01)
(Continued)

(52) U.S. Cl.
CPC ................. *B66D 5/34* (2013.01); *B66D 5/30* (2013.01); *F16D 63/006* (2013.01); *F16D 65/16* (2013.01);
(Continued)

(58) Field of Classification Search
CPC ........ B66D 5/30; B66D 5/34; B66D 2700/05; F16D 2121/22; F16D 2127/002;
(Continued)

(56) References Cited

U.S. PATENT DOCUMENTS 4,437,623 A * 3/1984 Wyder .................... B60R 22/42
242/381.1
4,513,952 A * 4/1985 Vandelinde .............. B66D 1/14
182/239
(Continued)

FOREIGN PATENT DOCUMENTS

CN    105800496    7/2016
DE    10148408    11/2002
(Continued)

OTHER PUBLICATIONS

Office Action dated Jan. 8, 2018 which issued in the corresponding Chinese Patent Application No. 201680005879.6.

*Primary Examiner* — Emmanuel M Marcelo
(74) *Attorney, Agent, or Firm* — Cozen O'Connor

(57) ABSTRACT

A method and a safety brake for a lifting device, wherein a solenoid or another electromechanical actuator is used to actuate a pawl, where the position of the pawl is monitored via at least two switches or sensors, where the lowering motion of the load or the lifting device is monitored and the safety brake is triggered in the event of a fault via a safety-oriented controller and at least one sensor, where the solenoid or the pawl is arranged such that, via spring force and/or gravity, the pawl is brought into engagement when (Continued)

the actuator, for example, the solenoid, is deenergized such that it is possible to exactly define and monitor the limit speed and, by using the two sensors, it is also possible to monitor the function and the motion of the pawl and to detect undesired operating states.

14 Claims, 3 Drawing Sheets

(51) Int. Cl.
*B66D 5/30* (2006.01)
*F16D 63/00* (2006.01)
*F16D 65/16* (2006.01)
*F16D 129/08* (2012.01)
*F16D 121/22* (2012.01)
*F16D 127/00* (2012.01)

(52) U.S. Cl.
CPC ...... *B66D 2700/05* (2013.01); *F16D 2121/22* (2013.01); *F16D 2127/002* (2013.01); *F16D 2129/08* (2013.01)

(58) Field of Classification Search
CPC ...... F16D 2129/08; F16D 63/06; F16D 41/12; F16D 48/064; F16D 48/10
See application file for complete search history.

(56) References Cited

U.S. PATENT DOCUMENTS

| | | | |
|---|---|---|---|
| 2014/0110650 A1* | 4/2014 | Rottlaender | B66D 1/58 254/267 |
| 2015/0014613 A1 | 1/2015 | Horndacher et al. | |
| 2016/0265609 A1* | 9/2016 | Corsetti | F16D 41/30 |

FOREIGN PATENT DOCUMENTS

| | | |
|---|---|---|
| JP | S525144 | 1/1977 |
| RU | 2505474 C1 | 1/2014 |
| WO | WO2013008288 | 2/2015 |

\* cited by examiner

SAFETY BRAKE FOR A LIFTING DEVICE

CROSS-REFERENCE TO RELATED APPLICATIONS

This is a U.S. national stage of application No. PCT/EP2016/050717 filed 15 Jan. 2016.

This application claims the priority of European application no. 15151312 filed Jan. 15, 2015 and European application No. 16151027 filed Jan. 13, 2016, the entire content of which is hereby incorporated by reference.

BACKGROUND OF THE INVENTION

1. Field of the Invention

The invention relates to a safety brake for a lifting device, and to a method for the safety brake for the lifting device.

2. Description of the Related Art

Electrically or hydraulically driven lifting devices are often used for lifting and lowering loads, where at least one rotating drive that establishes lifting or lowering of the load, respectively via a rope or another mechanical construction, such as via a scissors-type drive, is typically provided.

For the protection of people and material, it is often demanded that a lifting device is equipped with a safety brake. Such a safety brake is intended to decelerate the load and to bring the load to a standstill in the case of dangerous operating states, in particular in the case of an impermissibly high lowering speed of the load. Such an unintended movement can arise, for example, the cases of an unforeseen interruption in the power supply, in cases of a failure of a drive element or of a service brake, or for other reasons.

It is essential that the safety brake, which at times is also referred to as a "catch brake", is independent of the service brake. That is, the safety brake must also function when the service brake fails.

DE 101 48 408 C1 to Hoffmann, entitled "Safety Brake for an Electric Chain Block" shows a commonplace arrangement in which a drive shaft of a lifting device (presently an electric chain block) is equipped with an annular brake, i.e., with a friction-based deceleration installation. The annular brake is connected to a brake blocking gear disk, where a pawl latches in the latter in the case of a safety-related deceleration. A centrifugal installation that is connected to the drive is provided in order for the pawl to be activated. In the case of the service brake failing, or in the case of an excessive lowering speed of the lifting device that is caused by other reasons, the pawl is then brought to engage in the brake blocking gear disk, and the lifting device or the load of the lifting device, respectively, is decelerated and brought to a standstill on account thereof.

The conventional arrangement has the disadvantage that, by virtue of the triggering of the safety brake that is controlled by the centrifugal force, a substantial speed differential has to be present between the intended operational lowering of the load and the lowering speed in cases of a fault in order for a reliable differentiation to be able to be made between any regular lowering of the load and a malfunction. A further disadvantage lies in that testing of the centrifugal force installation can only be performed in that a load or a lowering test of the lifting device is performed at a very high speed. Testing of the centrifugal force installation and thus of the safety brake is thus associated with high load peaks and corresponding stress on the mechanism.

Moreover, the latest safety regulations pertaining to particularly critical application cases lead to problems potentially arising in the certification of the described prior art safety brakes.

SUMMARY OF THE INVENTION

It is therefore an object of the present invention to provide a safety brake for a lifting device that operates reliably, is capable of being set precisely, and the functioning of which can be monitored without any wear-intensive and complex testing.

It is a core concept of the solution to the object in accordance with the invention to employ a lifting magnet or another electro-mechanical actuator, instead of the conventional mechanical centrifugal force switch, for activating the pawl, where the respective position of the pawl is monitored by at least two switches or sensors, respectively, and where the lowering motion of the load or of the lifting device, respectively, is monitored by a safety-relevant controller and at least one sensor, and the safety braking procedure is triggered in cases of a fault. The lifting magnet or the pawl, respectively, herein is disposed such that the pawl is brought to engage by spring force and/or by weight force when the actuator, such as the lifting magnet, is switched to be without power or to be "non-energized", respectively. Such arrangements are also advantageously employable for lifting tables which currently are secured by so-called catch cylinders (displacement buffers), however, the activation of the latter also in a regular operation entailing high forces and thus losses and/or restricting the motion path of the lifting device.

While the pawl in the case of rotating drives, such as described in publication DE 101 48 408 C1, interacts with a conjointly rotating brake blocking gear disk as the brake blocking gear element, a rack (brake blocking rack) can be employed in the case of lifting tables and other linear applications as the brake blocking gear element, thus dispensing with a conversion of the linear movement to a rotating movement.

These and other objects and advantages are achieved in accordance with the invention by a safety brake for a lifting device, where a brake blocking gear element, in particular a brake blocking gear disk or a brake blocking rack, is connected to a drive of the lifting device, and where a pawl is provided for engaging in a latch void of the brake blocking gear element in cases of an impermissible lowering speed of the lifting device, where the brake blocking gear element is blocked.

An actuator for activating the pawl is also provided herein, where the pawl and the actuator are configured and disposed such a that the pawl, when in a non-energized state of the actuator bears on the brake blocking gear element or moves into the latch void of the brake blocking gear element, and the pawl in an energized state of the actuator moves away from the brake blocking gear element or moves out of the latch void and releases the brake blocking gear element.

Moreover, an electronic or numeric controller is provided for controlling the drive and for activating the actuator, where the controller is configured to monitor a lowering speed of the lifting device and a transfer of the actuator to the non-energized state occurs when a permissible lowering speed is exceeded, and where at least two sensors that are linked to the controller are provided for determining an operating state of the pawl, where via the sensors a differentiation in terms of the operating state can be made at least between the moved-away state, the bearing state, and the completely moved-into the latch void state.

On account of this safety brake, it is possible for the limit speed that has to be exceeded for the safety brake to be triggered to be precisely defined and monitored. Moreover, by employing the two sensors, e.g., switches, it is possible, via of the controller, for the functioning and the movement of the pawl to be monitored and for undesirable operating states to be identified, such as in those cases in which the safety brake is engaged and the drive of the lifting device would seek to continue to lower the load.

It is also an object of the invention to provide a method for a safety brake for a lifting device, where a brake blocking gear element is connected to a drive shaft of the lifting device and where a pawl engages in a latch void of the brake blocking gear element in cases of an impermissible lowering speed of the lifting device, where the brake blocking gear element is blocked. An actuator is provided herein for activating the pawl, where the pawl when in a non-energized state of the actuator is pressed against the brake blocking gear element or is moved into the latch void of the brake blocking gear element, and the pawl in an energized state of the actuator is moved away from the brake blocking gear element or is moved out of the latch void and the brake blocking gear element is released, where activation of the actuator is performed by an electronic or numeric controller, where a lowering speed of the lifting device is monitored by the controller and the actuator is set to the non-energized state when a permissible lowering speed is exceeded, and where a respective operating state of the pawl is detected by at least two sensors, wherevia the sensors a differentiation in terms of the operating state is made at least between the moved-away state, the bearing state, and the completely moved-into the latch void state, and where the signals of the two sensors and the detected speed are used by the controller in the actuation of the actuator and of the drive. The advantages that have already been explained via the device can be implemented with this method.

In one preferred embodiment, the actuator is an electric lifting magnet. Such lifting magnets can release the pawl particular rapidly once the power supply (energization) has been switched off, such that the lifting magnets, driven by a spring force and/or weight force, can click into a latch void of the brake blocking gear element. Alternatively, however, it is also possible for the pawl to be kept open pneumatically or hydraulically, where the controller, in this instance, can release the movement of the pawl by actuating a respective valve. However, it is important in this context that this locking is performed in an inherently safe manner which, in this context, means that the safe operating position must be automatically assumed in cases of a power outage, i.e., the pawl engages in the brake blocking gear element in a self-acting manner in cases of the power outage or similar.

Likewise, the controller (electronic or numeric controller) is advantageously configured so as to be redundant or inherently safe such that a malfunction always leads to an emergency stop of the lifting device. Likewise, the functioning of the speed sensor by which the lowering speed of the lifting device is monitored has to be configured so as to be redundant and/or be monitored by a dedicated safety circuit.

In one advantageous embodiment, the monitoring of a lowering speed of the lifting device or of the load moved by the latter, respectively, is performed via a rope encoder, this representing a commonplace and very reliable instrument. Alternatively, a rotational speed sensor or an incremental encoder, or the like, for detecting the speed can also be connected to a shaft of the drive of the lifting device, such as to the axle onto which the brake blocking gear element acts. Here, the brake blocking gear element is advantageously configured as a gear disk (brake blocking gear disk). In another advantageous embodiment, it is also possible for two completely different measurement installations, such as a rope encoder and a rotary sensor, or a radar sensor and a laser-based measuring method, etc., to be combined with one another for reciprocal checking.

The controller is advantageously configured such that bringing the pawl to bear on the brake blocking gear element in a regular operation is performed only in the case of a stationary drive of the lifting device. Wear on the pawl which could arise, for example, when the load is being lifted and in which moving the pawl away from the brake blocking gear element would not be mandatory in principle, is thus prevented.

A check of the functioning of the pawl and in particular of the two sensors for detecting the respective position or the respective operating state of the pawl, respectively, can be performed in a simple manner and above all also in a manner that is easy on the material in that the actuator is switched to be without power or non-energized, respectively, when the lifting device or the load of the lifting device, respectively, is lowered slowly (test operation), where the pawl initially has to bear on the brake blocking gear element and latter also has to move into the brake blocking gear element. This means that in the case of a test operation all three operating states and thus both sensors of the pawl must switch over when the actuator is triggered. It is moreover possible for the motor torque to be successively increased in order for the mechanical strength of the pawl and the holding torque of the brake blocking gear element to be checked in the case of this check, with the pawl clicking into place and the drive thus being stationary. Such checks can be performed automatically in a manner that is easy on the material at regular intervals, such as once per day or even before each productive use of the lifting device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE EXEMPLARY EMBODIMENTS

An exemplary embodiment of a safety brake according to the invention will be explained hereunder by means of the drawings. At the same time, the exemplary embodiment serves for explaining the method according to the invention, in which.

DETAILED DESCRIPTION OF THE EXEMPLARY EMBODIMENTS

Figure 1:
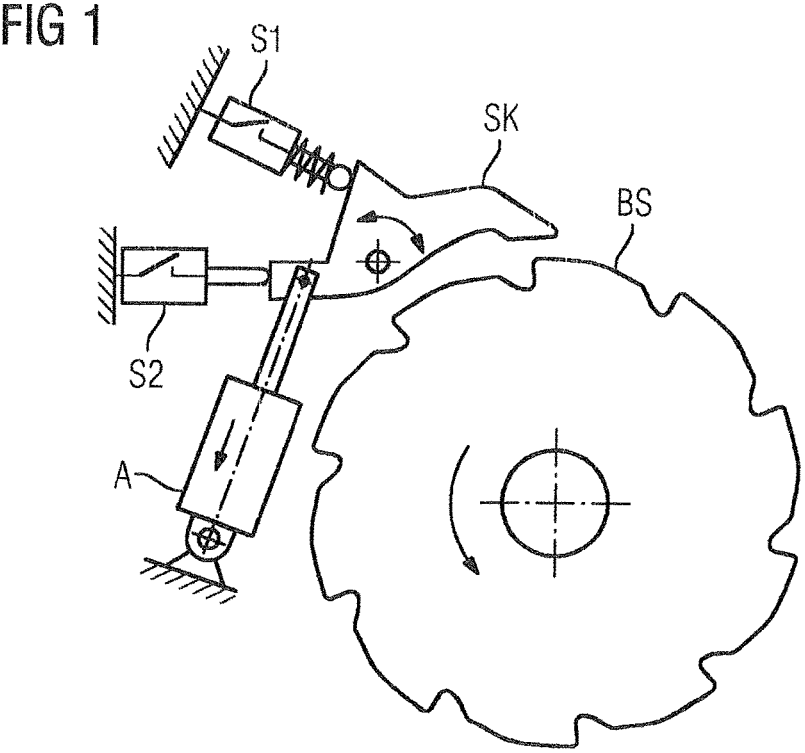
FIG. 1 shows a schematic diagram of the safety brake in accordance with the invention when lifting or lowering the load at a permissible speed.
Figure 2:
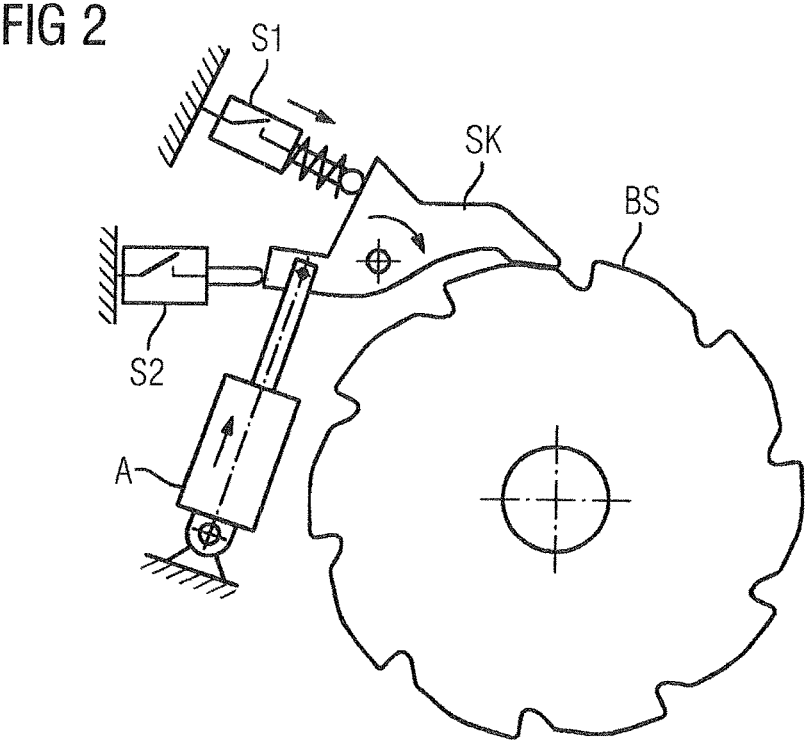
FIG. 2 shows the safety brake at an operational stoppage of the lifting device in accordance with the invention.
Figure 3:
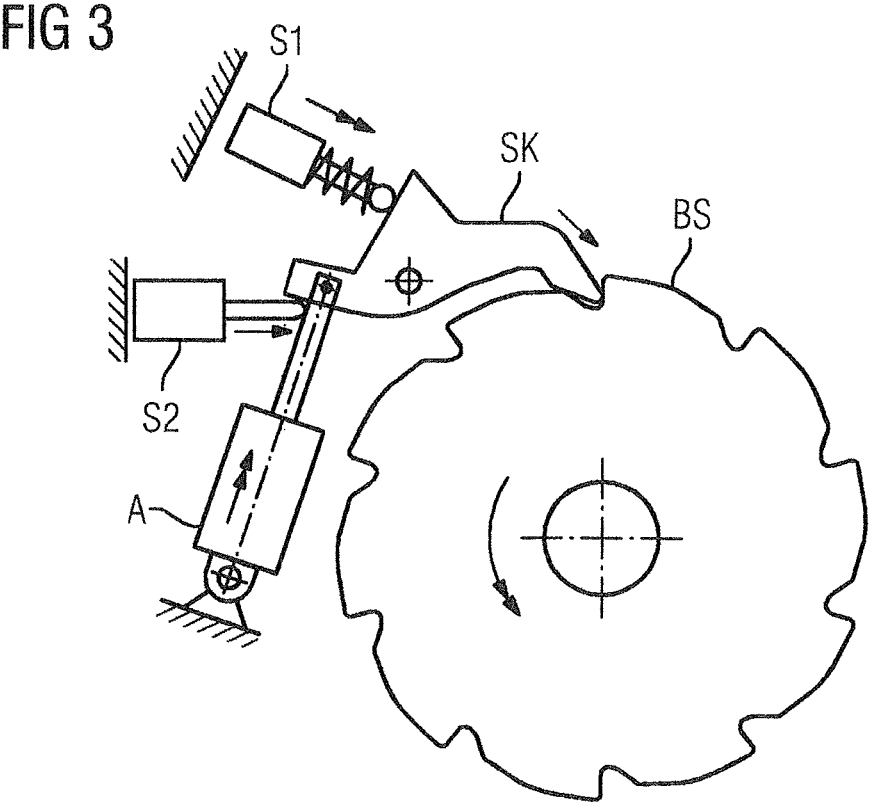
FIG. 3 shows a schematic diagram of the safety brake after the "catch incident" in the case of an emergency stop of the lifting device in accordance with the invention.

FIGS. 1, 2, and 3 each show the same arrangement in different operating states. Therefore, the explanations pertaining to the functioning of the individual components, and the reference signs that are introduced via FIG. 1, also apply in an analogous manner to FIGS. 2 and 3.

While a rotating brake blocking gear element (brake blocking gear disk) is illustrated in the figures, the brake blocking gear element can be formed in an analogous manner as a rack (brake blocking rack), in particular for lifting tables and other lifting devices that operate in a linear manner.

In FIG. 1, a brake blocking gear element BS that is designed as a brake blocking gear disk and hereunder is also referred to as such, and the pawl SK are illustrated as components of a lifting device, where the pawl SK is activated via an actuator A. The sensors S1 and S2 which, in the present exemplary embodiment, are formed as switches (break contacts) are activated by a movement of the pawl SK, where the pawl SK is pivotably mounted. The brake blocking gear disk BS, by way of an annular brake or another friction element (not illustrated), is connected to a drive axle of a lifting device (likewise not illustrated). The brake blocking gear disk BS and the remaining part (not illustrated) of the lifting device correspond substantially to the prior art such as is explained, for example, in publication DE 101 48 408 C1. However, the pawl SK, the activation of the latter (actuator A), and the sensor system (sensors S1 and S2) have been modified as compared to this prior art. A sensor (not illustrated) for monitoring the lowering speed or the load speed of the lifting device, respectively, is likewise a modification or an addition, respectively, to the prior art.

It is assumed hereunder that the lowering speed of the lifting device or of the load, respectively, is determined by a rotational speed sensor (not illustrated) on the rotation axis of the brake blocking gear disk BS. In terms of the Figures, the load is lowered when the brake blocking gear disk BS is rotated in a counter-clockwise manner, and the load is lifted when the brake blocking gear disk BS is rotated in the clockwise manner.

The sensors S1 and S2 are connected to a controller of the lifting device and provide the controller with information pertaining to the position of the pawl SK. The sensors S1 and S2 herein are assigned to one of three potential operating states (positions) of the pawl SK. Other combinations of sensors can also be used in alternative design embodiments. For example, a plurality of sensors can be combined in one component, or a single "analog encoder" can detect the pivot angle of the pawl SK and report the pivot angle to the controller (not illustrated). However, for reasons of fault monitoring, it is expedient for mutually independent sensors or switches, respectively, to be employed such that a plausibility check or functional monitoring is possible, respectively.

The sensor S1 in the present exemplary embodiment is wired and arranged such that the sensor S1 is closed when the pawl SK is moved away from the brake blocking disk BS, i.e., the pawl SK is not in contact with the brake blocking gear disk BS even in cases of a rotation of the brake blocking gear disk BS. This case is illustrated in FIG. 1. Here, the drive of the lifting device is released, specifically for lifting as well as for lowering the load, in cases of a closed switch or sensor S1, respectively.

The "regular standstill" of the lifting device is illustrated in FIG. 2, where the actuator A releases the pawl SK. As opposed to the illustration in FIG. 1, in which the actuator A has pushed the pawl SK away from the brake blocking gear disk BS, this means that the pawl SK by a spring force (the spring is illustrated on the activation element of the sensor S1) is now pivoted toward the brake blocking gear disk BS and bears on the latter. The sensor S1 is now opened, which can also be utilized for switching the drive of the lifting gear so as to be non-energized, for example. As opposed to the illustration in FIG. 1, the sensor S1 which presently is designed as a "break contact" has opened and, on account thereof, transmits to the connected controller the information pertaining to the pawl SK bearing on the brake blocking gear disk BS.

It should be noted once more here that the differentiation between the operating states of FIGS. 1 and 2 in principle can also be established by a single switch or sensor, respectively. However, the reciprocal monitoring of the correct functioning of the sensors S1 and S2, as is presently possible, is dispensed with in this instance. This means that the illustrated embodiment, having at least two sensors or switches, respectively, enhances the safety of the system or enables the identification of faults, respectively.

Because of the particular embodiment of the brake blocking gear disk BS, where the latch void has a depression in the tangential direction, the pawl SK plunges completely into the latch space of the brake blocking gear disk BS ("moved-in state") only when, in the case of a bearing pawl SK according to the illustration in FIG. 2, a further lowering motion (rotating movement of the brake blocking gear disk BS in a counter-clockwise manner) takes place. This state is illustrated in FIG. 3.

The state illustrated in FIG. 3 can thus only arise when a lowering of the load or of the lifting device, respectively, has been performed in a non-energized operating state of the actuator A, this not being envisaged in a regular operation of the lifting device. This means that the state illustrated in FIG. 3 can only arise in the "catch case", i.e., when the pawl SK moves in or clicks into place during a lowering operation. The pivotable pawl SK herein, as compared to the state according to FIG. 2, is pivoted farther in the direction of the rotation axis of the brake blocking gear disk BS, this being detected by activating (opening) the sensor S2 (break contact). On account thereof, the connected controller receives the information pertaining to the "catch case" having arisen, which can be utilized, for example, for shutting down the drive ("emergency stop"), for triggering an alarm, or the like.

In the case of the load or the lifting device, respectively, being lifted to plan (regular operation), the actuator A is activated, i.e., the lifting magnet in this example is "energized". On account thereof, the pawl SK is pivoted away from the brake blocking gear disk BS. This state is illustrated in FIG. 1. The lifting drive can be switched on and the service brake (if available) can be released. The same applies to the lowering to plan of the load. The drive as well as the actuator A are non-energized in the resting state ("lifting device stationary"). Any optionally available service brake is engaged. The pawl SK bears on the toothing of the brake blocking gear disk BS (FIG. 2) but does not move completely into a latch void of the brake blocking gear disk BS.

Should a failure of the service brake now arise, or should the load be unintentionally lowered farther for any other reason, the pawl SK clicks completely into the nearest latch void, and thus blocks the brake blocking gear disk BS. The lifting device or the load, respectively, is secured against further lowering. The sensor S2 is activated and prevents the drive from being switched on by a regular operating procedure. However, the drive in this position (FIG. 3) can be switched to "lifting" so as to disengage the pawl SK such that the state of FIG. 2 can be re-attained, and the pawl SK can then be moved away completely (FIG. 1) via the actuator A. In a manner analogous to the outlined case of a failure of the service brake in the resting state of the lifting device, the actuator A is released or switched to be "non-energized", respectively, also in cases of a failure of the lifting device in the running operation, i.e., in a state in which the pawl SK is moved away, according to the illustration in FIG. 1. This can be initiated by the controller, for example, when any exceeding of the permissible lowering speed of the load, or of a lowering rotational speed of a drive shaft of the lifting device, respectively, is detected by a rotational speed sensor or speed sensor, respectively, (not illustrated). The same applies to the case of an outage of the power supply or the like. In this instance, the pawl SK initially bears on the brake blocking gear disk BS (FIG. 2) and shortly thereafter clicks completely into a latch void such that the brake element of the brake blocking gear disk BS can decelerate and slow down the axle, the rope drum, or the like.

A safe operation of the safety brake is provided in particular by the use of two sensors S1 and S2 and by an automatic activation (by spring force and/or weight force) of the pawl SK in the non-energized state. Depending on the safeguarding against failure (safety classification) required, substantial elements of the achievement, in particular the controller and the sensors for detecting the speed of the load, can or should be configured so as to be redundant or be permanently monitored ("fail safe"). The achievement illustrated enables the trigger speed to be adhered to in a precise manner.

The achievement illustrated moreover enables the correct functioning of the pawl SK to be monitored by non-destructive test runs, where the lifting device is set in a slow lowering motion and the actuator A is switched to be non-energized, where all three operating states of the pawl SK outlined must be detected sequentially via the sensors S1 and S2. In the operating state of FIG. 3, in which the brake blocking gear disk BS is blocked in the lowering operation, the motor torque for the lowering motion can then be furthermore successively increased until a nominal torque is reached or until the brake element on the brake blocking gear disk BS begins to slip. The latter can be monitored by way of the rope encoder, the rotary encoder, or the like. In this way, it is possible for the holding torque of the braking action to be determined via the current picked up by the drive and for it to be established herein whether the value determined is within a prescribed nominal range. Both tests, i.e., the test of the sensors S1 and S2 as well as the test of the brake installation, can be triggered manually as well as be performed automatically by the lifting device at regular temporal intervals. It should be understood the test results are evaluated by the controller and visualized or documented in a corresponding manner, where it can be provided that the lifting device shuts down in a self-acting manner in cases of malfunctions or implausibilities.

Figure 4:
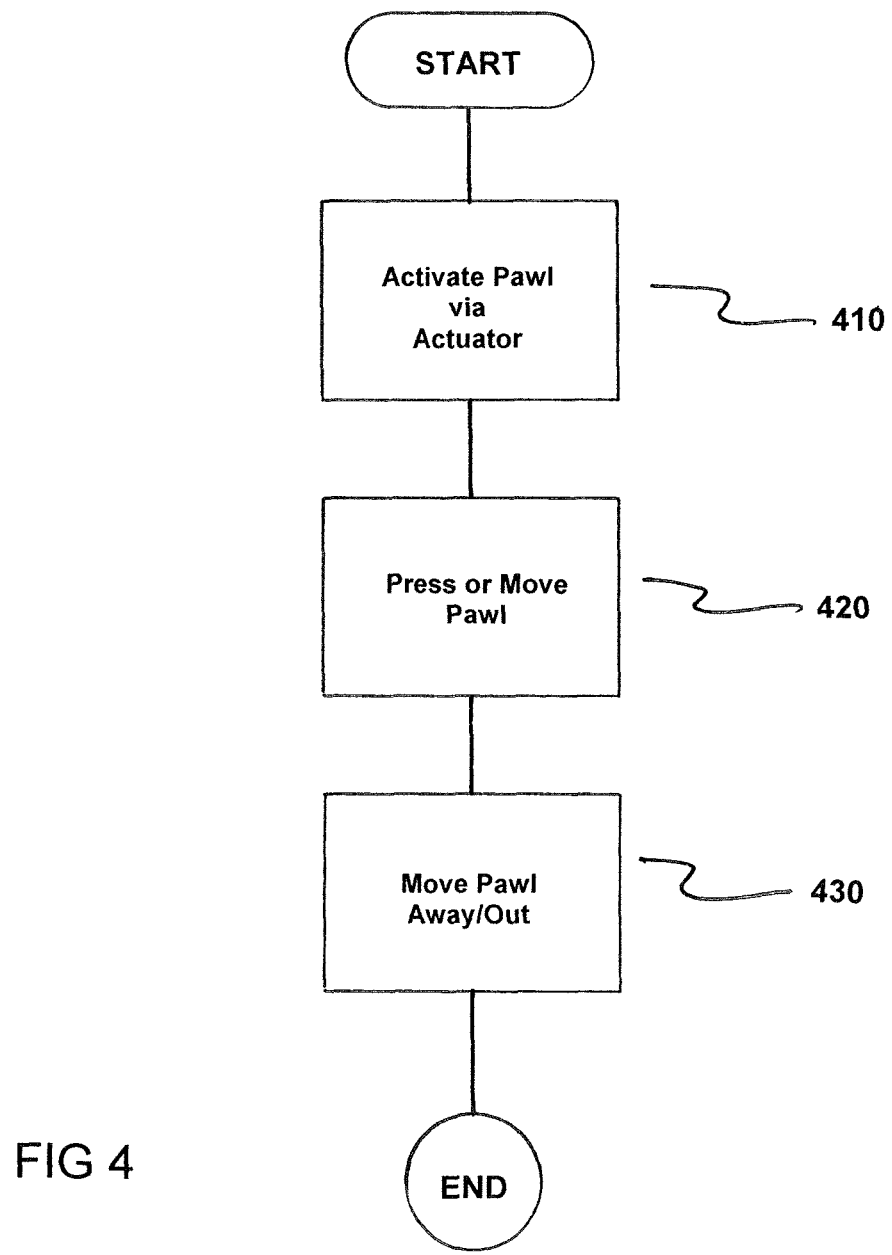
FIG. 4 is a flowchart of the method in accordance with the invention.

FIG. 4 is a flowchart of the method for a safety brake for a lifting device, where a brake blocking gear element BS is directly or indirectly connected to a drive of the lifting device, a pawl SK engages in a latch void of the brake blocking gear element BS in cases of an impermissible lowering speed of the lifting device occurring, and the brake blocking gear element BS being blocked.

The method comprises activating the pawl SK via an actuator A, as indicated in step 410. Next, the pawl SK is pressed against the brake blocking gear element BS or moved into the latch void of the brake blocking gear element BS in a non-energized state of the actuator A, as indicated in step 420.

Next, the pawl SK is moved away from the brake blocking gear element BS or is moved out of the latch void in an energized state of the actuator A, as indicated in step 430. Here, the brake blocking gear element BS is released.

In accordance with the invention, activation of the actuator A is performed by an electronic or numeric controller, where a lowering speed of the lifting device is monitored by the controller and the actuator A is set to the non-energized state when a permissible lowering speed is exceeded. Moreover, a respective operating state of the pawl SK is detected by at least two sensors S1, S2, where a differentiation with respect to the operating state occurs at least between the moved-away state, a bearing state and the completely moved-into the latch void state via the at least two sensors S1, S2. Furthermore, signals of the at least two sensors S1, S2 and the detected speed are used by the controller to actuate the actuator A and the drive.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A safety brake for a lifting device, comprising:
   a brake blocking gear element connected to at least one drive of the lifting device;
   a pawl for engaging in a latch void of the brake blocking gear element in cases of an impermissible lowering speed of the lifting device, the brake blocking gear element being blocked;
   an actuator for activating the pawl, the pawl and the actuator being configured and arranged such that, in a non-energized state of the actuator, the pawl bears on the brake blocking gear element or moves into the latch void of the brake blocking gear element, and in an energized state of the actuator, the pawl moves away from the brake blocking gear element or moves out of the latch void and releases the brake blocking gear element;
   an electronic or numeric controller for controlling the at least one drive and for activating the actuator, the controller monitoring the lowering speed of the lifting device, a transfer of the actuator to the non-energized state occurring when the permissible lowering speed is exceeded; and at least two sensors which are linked to the controller for determining an operating state of the pawl, a differentiation with respect to the operating state being determinable at least between the moved-away state, the bearing state, and the completely moved-into the latch void state via the at least two sensors.

2. The safety brake as claimed in patent claim 1, wherein the actuator is an electric lifting magnet.

3. The safety brake as claimed in patent claim 1, wherein the latch void of the brake blocking gear element is configured such that the pawl in cases of the lifting device being lowered moves completely into the latch void only when the pawl bears on the brake blocking gear element.

4. The safety brake as claimed in patent claim 1, wherein the controller activates the drive of the lifting device; wherein the controller is configured such that lowering of the lifting device in a regular operation is performed only in the energized state of the actuator.

5. The safety brake as claimed in patent claim 4, wherein the controller is further configured such that bringing the pawl to bear on the brake blocking gear element in the regular operation is performed only in cases of a stationary drive of the lifting device.

6. The safety brake as claimed in patent claim 1, wherein one of (i) a rope encoder is connected to the lifting device for monitoring a lowering speed of the lifting device and (ii) a rotational speed sensor is connected to the drive of the lifting device for monitoring the lowering speed of the lifting device.

7. The safety brake as claimed in patent claim 6, wherein one of (i) the rope encoder and (ii) the rotational speed sensor is configured in a fail-safe or redundant manner.

8. The safety brake as claimed in patent claim 1, wherein the controller is configured in a fail-safe or redundant manner.

9. The safety brake as claimed in patent claim 1, wherein a test run for testing the at least two sensors is implemented, the lifting device being lowered in cases of a non-energized actuator, the actuator being switched to a non-energized state, and the signals of the sensors being verified when the pawl is being brought to bear and is moving in.

10. The safety brake as claimed in patent claim 1, wherein at least one sensor of the at least two sensors is formed as a switch.

11. A method for a safety brake for a lifting device, a brake blocking gear element being directly or indirectly connected to a drive of the lifting device, a pawl engaging in a latch void of the brake blocking gear element in cases of an impermissible lowering speed of the lifting device occurring, and the brake blocking gear element being blocked, the method comprising:

activating the pawl via an actuator;

pressing the pawl against the brake blocking gear element or moving the pawl into the latch void of the brake blocking gear element in a non-energized state of the actuator; and moving the pawl away from the brake blocking gear element or moving the pawl out of the latch void in an energized state of the actuator, said brake blocking gear element being released;

wherein activation of the actuator is performed by an electronic or numeric controller, a lowering speed of the lifting device being monitored by the controller and the actuator being set to the non-energized state when a permissible lowering speed is exceeded;

wherein a respective operating state of the pawl is detected by at least two sensors, a differentiation with respect to the operating state occurring at least between the moved-away state, a bearing state and the completely moved-into the latch void state via the at least two sensors; and wherein signals of the at least two sensors and the detected speed are used by the controller to actuate the actuator and the drive.

12. The method as claimed in patent claim 11, wherein a lowering motion of the drive in a regular operation is switched off by the controller when at least one of (i) any exceeding of the permissible lowering speed is established and (ii) the bearing state or the completely moved-into the latch void state of the pawl is detected.

13. The method as claimed in patent claim 12, wherein a test run is performed to test the at least two sensors, the drive of the lifting device in cases of a non-energized actuator being switched to the lowering operation by the controller, the actuator being switched to the non-energized state, and functioning of the at least two sensors being verified when the pawl is being brought to bear and is moving in.

14. The method as claimed in patent claim 11, wherein a test run is performed to test the at least two sensors, the drive of the lifting device in cases of a non-energized actuator being switched to the lowering operation by the controller, the actuator being switched to the non-energized state, and functioning of the at least two sensors being verified when the pawl is being brought to bear and is moving in.

* * * * *